(12) United States Patent
Fujita

(10) Patent No.: US 8,310,906 B2
(45) Date of Patent: Nov. 13, 2012

(54) OPTICAL DISC APPARATUS AND OPTICAL DISC RECORDING/REPRODUCING METHOD

(75) Inventor: Shinji Fujita, Yokohama (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/778,540

(22) Filed: May 12, 2010

(65) Prior Publication Data

US 2011/0063961 A1 Mar. 17, 2011

(30) Foreign Application Priority Data

Sep. 14, 2009 (JP) ................. 2009-211248

(51) Int. Cl.
*G11B 7/00* (2006.01)
*G11B 20/10* (2006.01)
*G11B 27/36* (2006.01)
*G11B 7/125* (2006.01)
*G11B 7/28* (2006.01)

(52) U.S. Cl. ............. 369/47.19; 369/124.12; 369/44.41; 369/44.42; 369/53.22; 369/53.27; 369/85

(58) Field of Classification Search ............... 369/47.19, 369/124.12, 44.41, 44.42, 53.22, 53.27, 85
See application file for complete search history.

(56) References Cited

U.S. PATENT DOCUMENTS

| 2002/0075783 | A1* | 6/2002 | Alon et al. ............. 369/112.02 |
| 2002/0085465 | A1* | 7/2002 | Kobayashi ................ 369/53.2 |
| 2005/0030875 | A1* | 2/2005 | Horimai .................... 369/103 |
| 2006/0285469 | A1* | 12/2006 | Tonami ..................... 369/103 |
| 2007/0058503 | A1* | 3/2007 | Watabe et al. ........... 369/44.39 |
| 2008/0205244 | A1* | 8/2008 | Kitabayashi ............ 369/112.04 |
| 2010/0080095 | A1* | 4/2010 | Kobayashi et al. ....... 369/47.15 |

FOREIGN PATENT DOCUMENTS

| JP | 06-290485 | 10/1994 |
| JP | 10-106161 | 4/1998 |
| JP | 2006-014049 | 1/2006 |

\* cited by examiner

*Primary Examiner* — Joseph Feild
*Assistant Examiner* — Aneeta Yodichkas
(74) *Attorney, Agent, or Firm* — McDermott Will & Emery LLP

(57) ABSTRACT

An optical disc apparatus includes an optical pickup including: a light source; an objective lens for converging a light flux emitted from the light source and forming an optical spot on an information recording plane of an optical disc; and an optical modulation unit divided into a plurality of areas for modulating an area containing a main beam of the light flux to change a shape of the optical spot, wherein data is reproduced by converting a reproduction signal read from the optical disc with the optical pickup into an NRZI signal of a predetermined modulation rule by a PRML method. An optical spot shape, laser power setting and PRML setting are changed with each optical disc and each drive operation state.

2 Claims, 8 Drawing Sheets

OPTICAL DISC APPARATUS AND OPTICAL DISC RECORDING/REPRODUCING METHOD

INCORPORATION BY REFERENCE

The present application claims priority from Japanese application JP 2009-211248 filed on Sep. 14, 2009, the content of which is hereby incorporated by reference into this application.

BACKGROUND OF THE INVENTION

The present invention relates to an optical disc apparatus and an optical disc recording/reproducing apparatus.

Prior art includes, for example, Patent Document 1 (JP-A-2006-14049), Patent Document 2 (JP-A-10-106161) and Patent Document 3 (JP-A-6-290485).

Patent Document 1 describes that “a single recording/reproducing apparatus is required to be provided with a plurality of operation modes having different constraint lengths such as PR(1, 2, 1) and PR(1, 3, 3, 1)”.

Patent Document 1 also describes that “a PR class optimum to each operation mode is able to be selected in this circuit so that the reproducing characteristics are able to be improved”.

Patent Document 2 describes that “a value X given to intersymbol interference for PR equalization is selected in accordance with the characteristics (bit error rates) of waveforms reproduced from the optical disc 1, the characteristics being dependent upon the type of medium of the optical disc 1, and tap coefficients of the transversal filter 3 and discrimination signal levels of the decoder 11 are obtained in accordance with the X value so that even if the type of medium of the optical disc 1 is different, correct reproduction is possible”.

Patent Document 3 describes that “as the control unit 110 is operated to set an optical transmittance of the central portion 112 to “0”, i.e., to a light blocking state, it becomes possible to obtain a ultra high resolution spot having a diameter reduced along the “1” direction similar to the conventional light blocking plate 107 illustrated in FIG. 38. As the control unit 110 is operated to set an optical transmittance of the central portion 112 to “1”, i.e., to a through state, it becomes possible to obtain a usual focusing spot without a ultra high resolution. It is therefore possible to drive a medium having a high recording density with a smaller diameter focusing spot and to drive a medium having a low recording density with a usual focusing spot. It is therefore possible to drive a medium having conventional specifications and a large capacity medium with the same head”.

Patent Document 3 describes that “during recording, a spot diameter is not stopped down. In an amplitude modification of a collimate beam with the modulation unit 111, a laser power loss is large as already pointed out. Because of a limit on a maximum output power of a semiconductor laser of an optical disc apparatus, an upper limit of a data transfer rate (i.e., a disc revolution) is restricted or an upper limit of a recording power usable by a recording medium is suppressed. A loss of a laser power is critical to the performance. It is therefore desired to drive without amplitude modulation during recording and erasing. Driving is possible even if a focusing spot diameter during recording is not stopped down as in the case of reproducing”.

Patent Document 3 describes that “in the eighteenth embodiment, retry reproduction is performed by changing the modulation signal having set so as to obtain a focusing spot judged optimum, in a predetermined range. A possibility of avoiding a disable state of signal reading is therefore increased and reliability of data storage is improved.”

SUMMARY OF THE INVENTION

Blu-ray disc (herein after abbreviated to “BD”) has been developed and is commercially available as an optical disc capable of recording higher-definition video for two hours or longer. For BD realizing a capacity of 25 GB per one layer on one side, a semiconductor laser at a wavelength band of 405 nm (blue-purple) is used as a light source, and an aperture of the objective lens is set to 0.85. 1-7 PP modulation is adopted for modulation code, and the shortest mark length and shortest space length are each 2T and about 0.15 μm, where T is a data detection window width. A track pitch is about 0.32 μm.

Development is under consideration for an optical disc (hereinafter called next generation BD) having a high recording density about 1.35 times as that of current BD and using an optical system and signal formats of current BD. This density corresponds to about 33 GB per one layer on one side. By using a multilayer structure of three or four layers on one side, a large capacity disc over 100 GB is desired to be realized.

A recording/reproducing apparatus for next generation BD is required to be able to record/reproduce current BD, i.e., be compatible with current BD.

Regarding the techniques of maintaining compatibility of a single apparatus with a plurality of discs having difference densities, Patent Document 1 and Patent document 2 adopt a PRML mode for reproduction series. Patent Document 1 discloses the techniques of switching PR constraint lengths. Patent Document 2 discloses the techniques of changing the PR class and changing the tap coefficients of the transversal filter and discrimination signal levels of the ML decoder. Patent Document 3 discloses the techniques of driving a disc by changing the shape of a focusing spot.

In current BD, a cutoff spatial frequency of an optical system is about 4200 lines/mm as calculated from the above-described wavelength and the aperture of the objective lens. A spatial frequency of a repetition pattern of shortest marks and shortest spaces is about 3360 lines/mm which is about 80% of the cutoff spatial frequency. In next generation BD, a spatial frequency of a repetition pattern of shortest marks and shortest spaces is about 4430 lines/per mm which is about 105% of the cutoff spatial frequency. There arises therefore an issue not considered heretofore that it is not possible to obtain reproduction signal amplitudes of shortest marks and spaces.

The present invention has been made in view of the above-described issue, and an object of the present invention is to ensure compatibility of a recording/reproducing apparatus between next generation BD and current BD. Another object of the present invention is to improve a recording/reproducing performance of next generation BD. Still another object of the present invention is to realize a higher density such as 36 GB per one layer on one side.

In order to settle the above-described issue, the present invention uses, for example, configurations described in “CLAIMS”.

According to the present invention, it is possible to ensure compatibility of a recording/reproducing apparatus between next generation BD and current BD.

Other objects, features and advantages of the invention will become apparent from the following description of the embodiments of the invention taken in conjunction with the accompanying drawings.

DESCRIPTION OF THE EMBODIMENTS

With reference to the accompanying drawings, detailed description will now be made on an optical disc apparatus and an optical disc recording/reproducing method according to the embodiments of the present invention. According to the optical disc apparatus of the embodiments, it becomes possible to stably record/reproduce an optical disc, particularly an optical disc made to have a high density by setting a spatial frequency of a repetition pattern of shortest marks and spaces to an optical system cutoff frequency or higher.

1. First Embodiment

With reference to the accompanying drawings, description will be made on the structure and operation of a recording/reproducing apparatus for next generation BD according to the first embodiment of the present invention.

Figure 2:
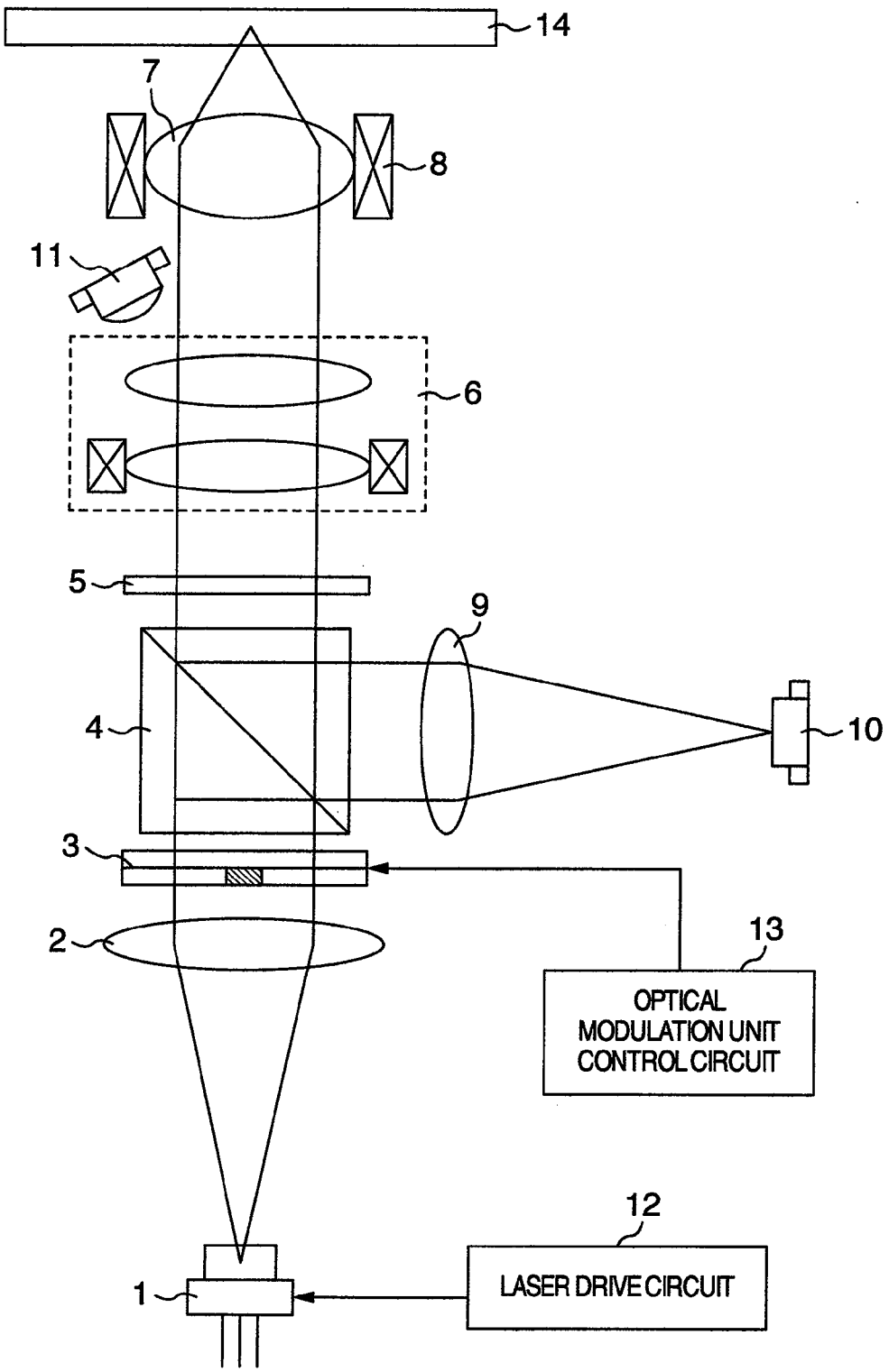
FIG. 2 is a diagram illustrating the structure of an optical pickup of the first embodiment.

FIG. 2 is a diagram illustrating the structure of an optical pickup of the first embodiment. The optical pickup of the embodiment includes: a laser light source 1 of a 405 nm band corresponding to a BD wavelength; a laser drive circuit 12 for driving the laser light source; a collimate lens 2 for converting a light flux radiated from the laser light source into a parallel light flux; an optical modulation unit 3 capable of modulating an amplitude of a partial light flux when the parallel light flux transmits through the optical modulation unit 3; a polarization beam splitter 4 for transmitting a predetermined linearly polarized beam approximately 100% and reflecting a linearly polarized beam orthogonal to the first mentioned linearly polarized beam approximately 100%; a quarter wavelength plate 5 for converting a linearly polarized beam into a circularly polarized beam and vice versa; a spherical aberration correcting unit 6 constituted of two combined lenses with a variable inter-lens distance for adjusting a spherical aberration of a parallel light flux in accordance with a cover layer thickness of a mounted optical disc 14; an objective lens 7 for forming an optical spot on a predetermined information recording layer of the optical disc 14 by converging a parallel light flux at a predetermined NA and at a predetermined aberration amount or smaller; and an objective lens actuator 8 for displacing the objective lens 7 along a focusing direction and a tracking direction. The optical pickup includes also: a front monitor 11 for receiving a partial light flux radiated from the laser light source 1 and converting the received light flux into an electric signal; a detector lens 9 for converting a light flux reflected from the optical disk into a predetermined converged light flux; and a photodetector 10 for receiving the converged light flux and converting the received light flux into an electric signal.

A linearly polarized light flux radiated from the laser light source 1 is converted by a parallel light flux by the collimator lens 2 to be input to the optical modulation unit 3.

Figure 3:
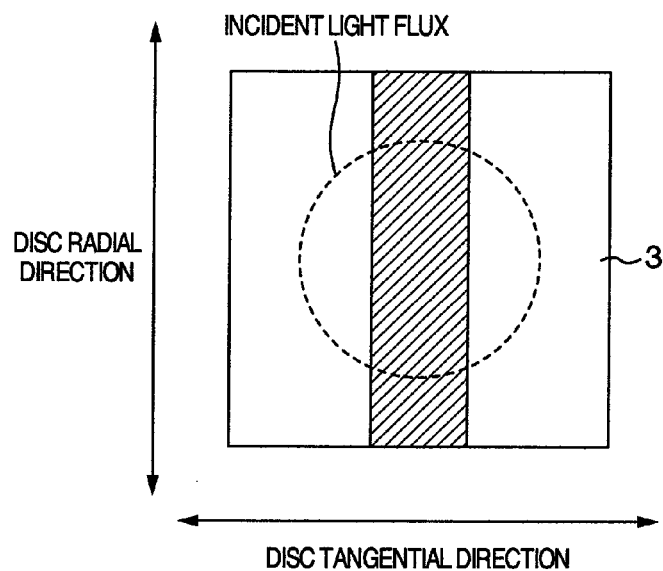
FIG. 3 is a plan view of an optical modulation unit of the first embodiment.

The optical modulation unit 3 of the embodiment is constituted of a liquid crystal device divided into three areas along a disc tangential direction and a polarizer device for transmitting a predetermined linearly polarized beam approximately 100% and reflecting a linearly polarized beam orthogonal to the first mentioned linearly polarized beam approximately 100%. FIG. 3 is a plan view of the optical modulation unit 3 of the embodiment illustrating an example of a division pattern of the liquid crystal device. In this embodiment, a width of a central area is about one third of an incident light flux. An optical rotation degree of the central area can be controlled by making an optical modulation unit control circuit 13 electrically operate the central area. In an operation state, a transmitted light flux rotates by 30 degrees relative to an incident light flux, and in a non-operation state, there is no optical rotation. A linearly polarized beam incident upon opposite side areas transmits without a change in the polarized direction. The polarizer device is disposed in such a manner that the linearly polarized beam transmitted through the side areas and the linearly polarized beam transmitted through the central area in the non-operation state are both transmitted approximately 100%.

The above-described parallel light flux becomes incident upon the liquid crystal device as a predetermined linearly polarized beam. A center of the incident light flux generally corresponds to the center of the central area along the disc tangentially direction. As the optical modulation unit control circuit 13 makes the liquid crystal device enter the operation state, a light flux transmitted through the central area rotates about 30 degrees so that the light flux transmitted through the polarizer device becomes a linearly polarized beam having an amplitude of about 0.87 time. Namely, the intensity of light transmitted through the central area is reduced to about 75% of the incident light intensity. In the non-operation state of the liquid crystal device, a light flux transmitted through the central area will not rotate and an amplitude of a light flux transmitted through the polarizer device is the same as that of the incident light flux. Namely, the intensity of light transmitted through the central area will not change and is about 100% of the incident light intensity. The intensity of light transmitted through the side areas will not change and is about 100% of the incident light intensity, irrespective of whether the liquid crystal device is in the operation state or in the non-operation state.

A light flux transmitted through the optical modulation unit 3 becomes a predetermined linearly polarized beam irrespective of whether the optical modulation unit 3 is in the operation state or in the non-operation state. This linearly polarized beam becomes incident upon the polarization beam splitter 4 to be transmitted approximately 100%. The light flux transmitted through the polarization beam splitter 4 is then converted into the circularly polarized beam by the quarter wavelength plate 5, and the circularly polarized beam is given a predetermined spherical aberration by the spherical aberration correcting unit 6 to be thereafter guided to the objective lens 7. The objective lens 7 converges the incident light flux on the information recording layer of the optical disc 14 to form an optical spot.

Description of this embodiment will be made on an optical spot shape which changes with the operation state and non-operation state of the optical modulation unit 3.

An optical intensity distribution on an entrance pupil of the objective lens 7 corresponds to the relation between an incident light flux diameter and each area. Namely, the entrance pupil is divided approximately equally into three areas along the disc tangential direction, and an optical intensity of the central area changes with whether the optical modulation unit 3 is in the operation state or in the non-operation state.

Figure 4:
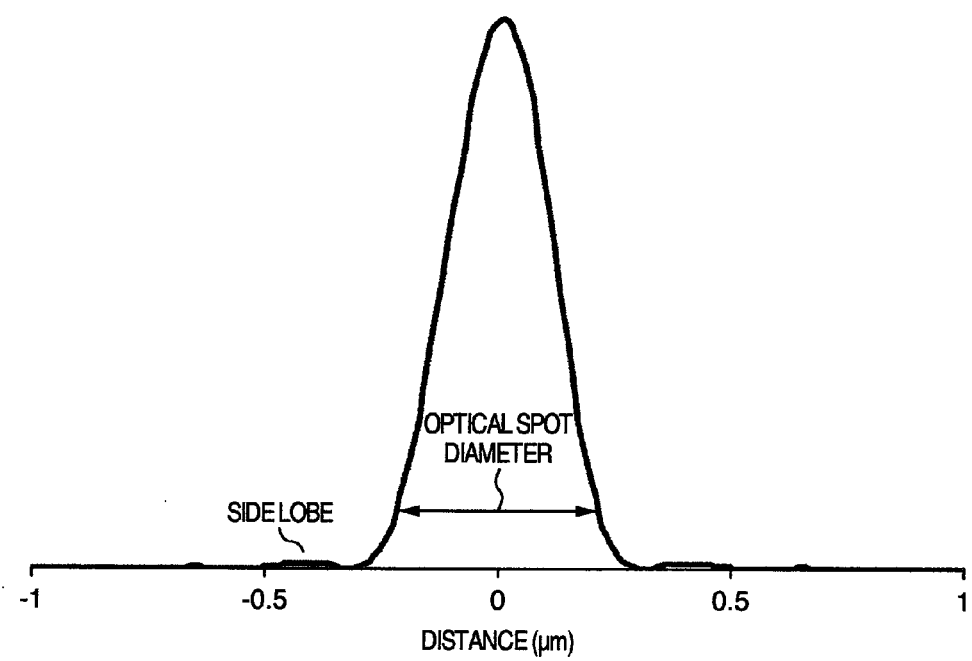
FIG. 4 is a graph illustrating an example of calculation results of an intensity distribution of a first optical spot along a tangential direction of the embodiment.

More specifically, a first optical spot is formed in the non-operation state of the optical modulation unit 3. The transmittance of each area of the optical modulation unit 3 is equal, and an optical intensity distribution on an entrance pupil is a continuous optical intensity distribution corresponding to a Gaussian optical intensity distribution of an optical flux radiated from the laser light source 1. FIG. 4 illustrates an example of calculation results of an intensity distribution of the first optical spot, and is a cross sectional view along the disc tangential direction. This optical intensity distribution is equivalent to that of an optical spot of a recording/reproducing apparatus for current BD.

On the other hand, in the operation state of the optical modulation unit 3, a transmittance of the central area of the optical modulation unit 3 reduces approximately to 75%, and a transmittance of the side area is equal to that in the non-operation state. An optical intensity distribution on an entrance pupil has a relatively lower optical intensity in the central area, and is discontinuous between the central area and side areas. A second optical spot different in shape from the first optical spot is therefore formed. Reflecting upon this discontinuous optical intensity distribution on the entrance pupil, the second optical spot tends to be a so-called ultra high resolution optical spot along the disc tangential direction. Namely, there is a tendency that an optical spot diameter, defined by a distance between two points of $1/e^2$ of the peak intensity, is reduced relatively, and a peak intensity of side lobes increases relatively. ("^" is an operator of exponentiation.) According to an example of calculation results of this embodiment, a diameter of the second optical spot along the disc tangential direction is reduced to 0.411 µm, and that of the first optical spot is 0.416 µm.

A spot shape has no significant difference along the disc radial direction between the operation state and non-operation state of the optical modulation unit 3. Even the objective lens 7 is displaced by the objective lens actuator 8 along the tracking direction, i.e., along the disc radial direction, each area among equally divided three areas will not change on the entrance pupil. It is therefore possible to suppress a shape difference of an optical spot during tracking operation to the same degree as that of the first optical spot in the non-operation state of the optical modulation unit 3.

A light flux reflected from the optical disc 14 transmits again through the objective lens 7 and spherical aberration correcting unit 6, and is converted by the quarter wavelength plate 5 into a linearly polarized beam orthogonal to a linearly polarized beam transmitted through the optical modulation unit 3. This light flux is reflected by the polarization beam splitter 4 approximately 100%, and converted into a predetermined converged light flux by the detection lens 9 to be guided to the photodetector 10.

Figure 6:
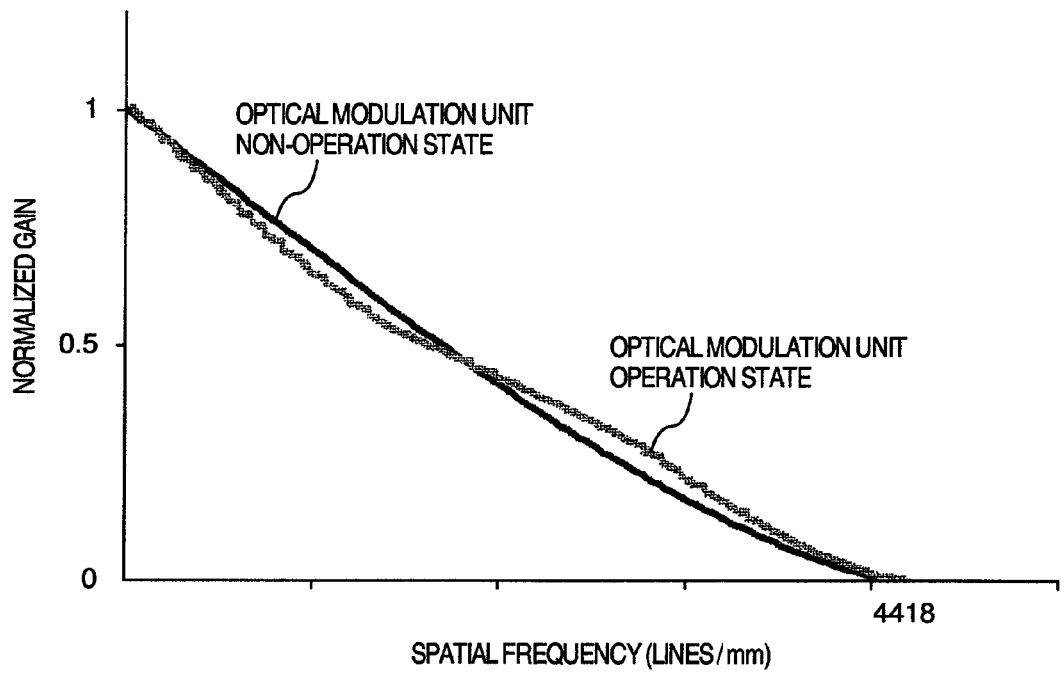
FIG. 6 is a graph illustrating an example of MTF calculation results of an optical system of the first embodiment.

FIG. 6 illustrates an example of calculation results of a modulation transfer function (MTF) of the optical system of the embodiment. This graph is normalized by setting a gain to "1" at DC (spatial frequency=0 line/mm). An influence of a disc structure such as a pit shape is not considered.

As compared with MTF of the optical system for current BD, the cutoff spatial frequency is coincident at about 4200 lines/mm because the cutoff spatial frequency is determined by an aperture and a wavelength irrespective of whether the optical modulation unit 3 is in the operation state or in the non-operation state. The gain characteristics are similar to those of current BD in the non-operation state of the optical modulation unit 3, although the gain in the operation state of the optical modulation unit 3 increases on a high frequency side and decreases on a low frequency side. These characteristics that the gain changes in this manner are characteristic to the above-described ultra high resolution optical spot.

In this embodiment, in order to suppress a distortion of a reproduced waveform of a long mark and a long space, it is made consciously that the gain monotonously reduces relative to a spatial frequency. However, the gain characteristics different from those of the embodiment may be obtained by changing an optical intensity distribution on an entrance pupil by setting the pattern of the optical modulation unit 3 and a transmittance during operation different from those of the embodiment. Qualitatively, a gain on the high frequency side can be increased more and a gain on the low frequency side can be reduced more the wider the width of the central area is set and the lower the transmittance is set.

Figure 7:
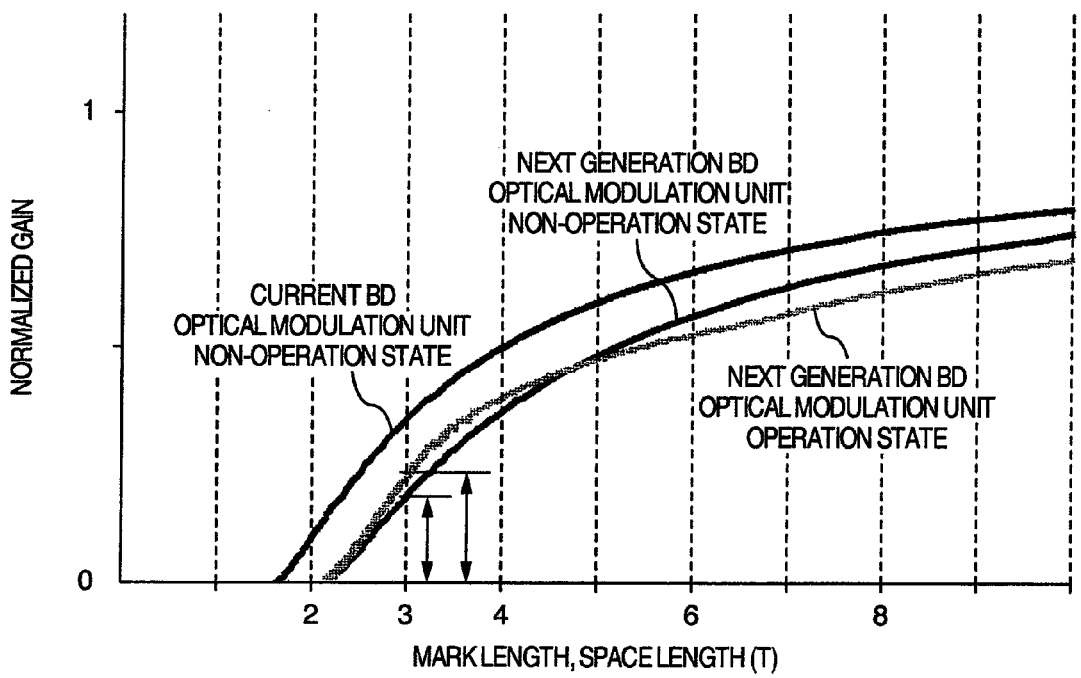
FIG. 7 is a graph illustrating an example of MTF calculation results of the optical system of the first embodiment, by plotting mark length and space length as the X axis.

FIG. 7 is a graph illustrating an example of MTF calculation results of FIG. 6, by plotting along the Y-axis the gain of MTF of a repetition pattern of mark length and space length used as the X-axis. Although a gain for current BD is about 0.1 at 2T mark length and 2T space length, a gain for next generation BD is 0 at 2T mark length and 2T space length, and a reproduced signal amplitude cannot be obtained.

In this embodiment, a reproduction signal process is executed by a PRML method. The PRML method is a reproduction signal processing method combining a PR method and an ML method. The PR method uses a transfer function of a transmission line as a model of intersymbol interference, and multiplies a waveform distorted by intersymbol interference by an inverse transfer function to recover an original waveform. The ML method is an algorithm of deriving a data set most likely to the original data set based on the past data set. Although the details of the PRML method are omitted, this method allows data to be reproduced by judging a signal without amplitude as 2T, even if the 2T signal amplitude cannot be obtained. Since an amplitude of a 3T signal is not so large, there arises an issue that an erroneous discrimination occurs between the 2T and 3T signals. In order to realize stable data reproduction having a low error rate, it is important to improve a carrier to noise ratio (CNR) of the 3T signal.

In this embodiment, as the optical modulation unit 3 enters the operation state, a gain of the 3T signal can be increased as illustrated in FIG. 7, i.e., CNR of the 3T signal can be improved. CNR is improved by about 2 dB as compared with the non-operation state.

Figure 9:
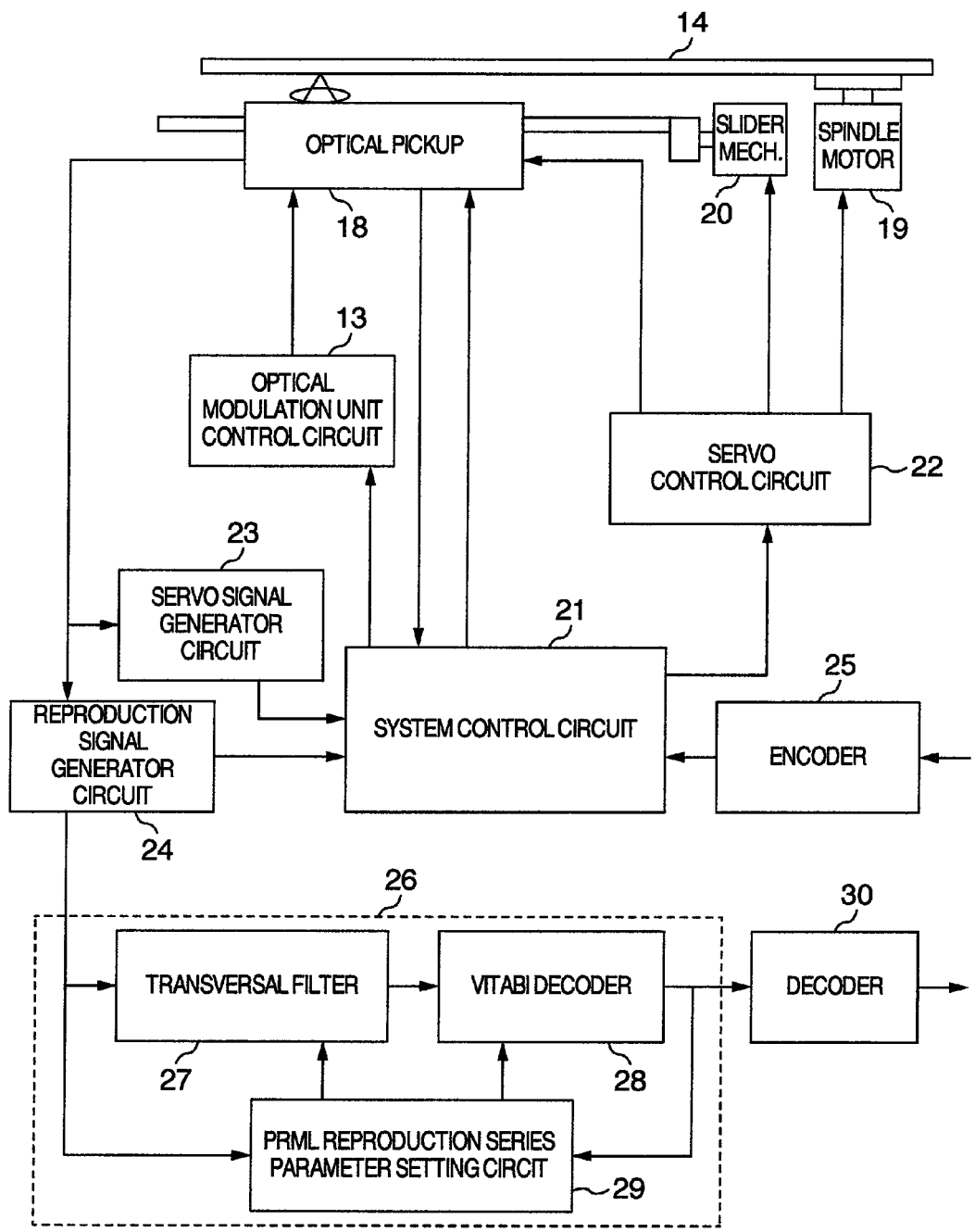
FIG. 9 is a block diagram of an optical disc apparatus of the first embodiment.

FIG. 9 is a block diagram of an optical disc recording/reproducing apparatus of the embodiment. The optical disc recording/reproducing apparatus includes: an optical pickup 18, a spindle motor 19, a slider mechanism 20, a system control circuit 21, a serve control circuit 22, an optical modulation unit control circuit 13, a servo signal generator circuit 23, a reproduction signal generator circuit 24, a PRML reproduction circuit 26, an encoder 25 and a decoder 30.

The structure and operation of the optical pickup 18 are the same as those described above.

The system control circuit 21 has a function of controlling the total operation of the optical disc recording/reproducing apparatus of the embodiment. Namely, the system control circuit performs rotation control of the optical disc 14 mounted on the spindle motor 19 via the servo control circuit 22, performs access control and feed control to displace the optical pickup 18 along the radial direction of the optical disc 14 by driving the slider mechanism 20, performs focus control and tracking control of the objective lens 7 by driving the objective lens actuator 8 mounted on the optical pickup 18, and performs correction of a spherical aberration by driving the spherical aberration correcting unit 6 mounted on the optical pickup 18. The system control circuit switches between the operation state and non-operation state of the optical modulation unit 3 via the optical modulation unit control circuit 13, as described earlier.

In accordance with an output of the front monitor 11 mounted on the optical pickup 18, the system control circuit 21 drives the laser light source 1 via the laser drive circuit 12 to make the laser light source 1 radiate light of a predetermined light amount. For data recording, a data recording signal is converted by the encoder 25 into an NRZI signal of a predetermined modulation rule and supplied to the system control circuit 21 which in turn converts the NRZI signal into recording strategy (an emission pulse train) to make the laser light source 1 emit light at a predetermined light intensity and pulse width.

A light flux reflected from the optical disc 14 is received at the photodetector 10 and converted into an electric signal which is sent to the servo signal generator circuit 23 and reproduction signal generator circuit 24. The servo signal generator circuit 23 selects and generates various servo signals by using a detection method suitable for the mounted optical disc 14, and supplies the servo signals to the system control circuit 21. The servo signals include a focus error signal and a tracking error signal. In accordance with these servo signals, the system control circuit 21 drives the objective lens actuator 8 via the servo control circuit to perform focus servo and tracking servo. In accordance with an amplitude of a focus servo push pull signal generated by the servo signal generator circuit 23 and an amplitude of a reproduction signal supplied via the reproduction signal generator circuit 24, the system control circuit 21 drives the spherical aberration correcting unit 6 via the servo control circuit 22 to correct a spherical aberration corresponding to a thickness of the cover layer of the optical disc 14.

The reproduction signal generator circuit 24 has a waveform equalizer circuit and an A/D converter, executes a predetermined waveform equalization process for an analog reproduction signal supplied from the optical pickup 18, converts the analog signal into a digital signal through sampling and quantization, and supplies the digital signal to the PRML reproduction circuit 26.

The PRML reproduction circuit 26 has a transversal filter 27, a Viterbi decoder circuit 28 and a PRML reproduction series parameter setting circuit 29. The digital signal supplied from the reproduction signal generator circuit 24 is equalized to a predetermined PR class by the transversal filter 27. The Viterbi decoder 28 performs maximum likelihood decoding to convert the equalized waveform into an NRZI signal of a predetermined modulation rule. The PRML reproduction series parameter setting circuit 29 has a function of evaluating an error of the NRZI signal generated by the Viterbi decoder 28. The PRML reproduction series parameter setting circuit has also a function of determining a target waveform which is obtained after PR equalization by the transversal filter 27 corresponding to the PR class and the signal level supplied from the reproduction waveform generator circuit 24, and in accordance with the target waveform and the error evaluation result, setting tap coefficients of the transversal filter 27 and discrimination signal levels of the Viterbi decoder 28.

Figure 5:
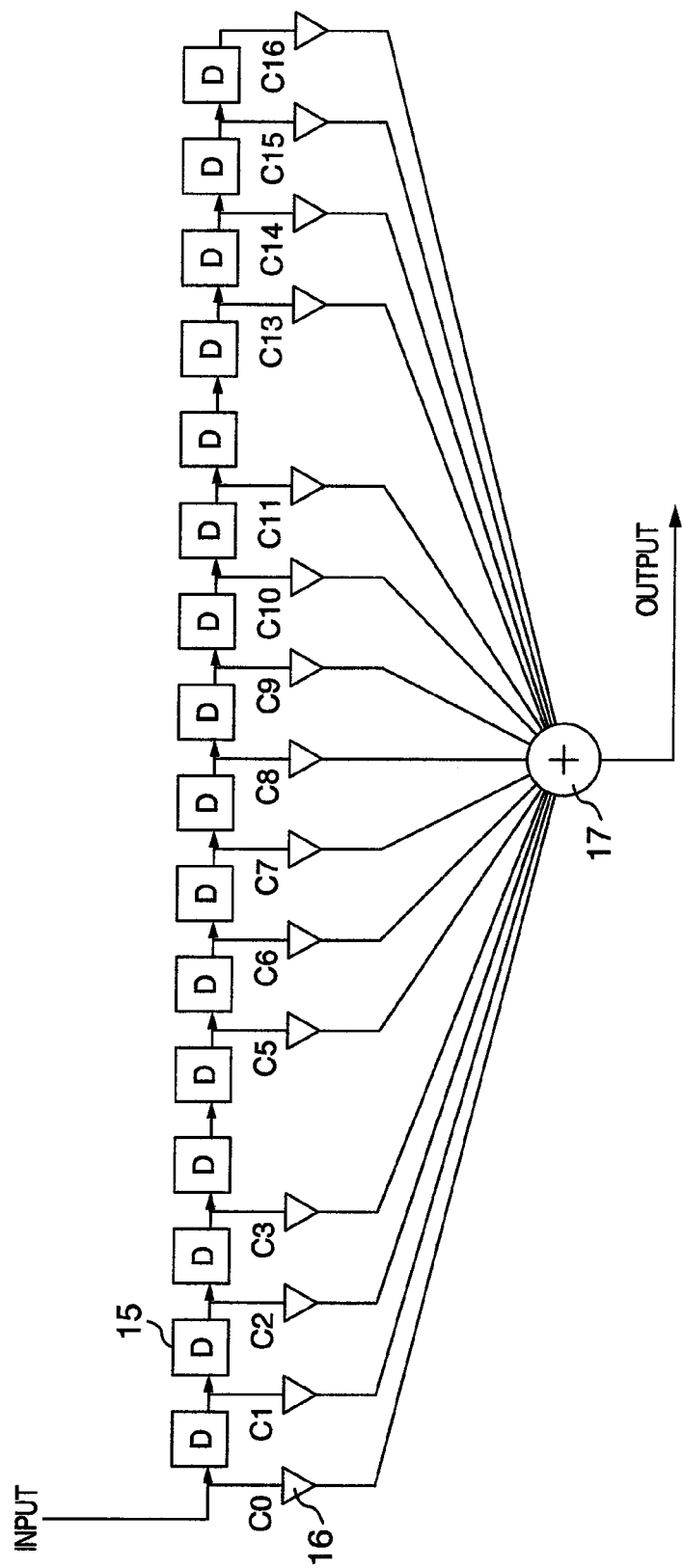
FIG. 5 is a block diagram of a transversal filter of the first embodiment.

FIG. 5 is a block diagram of the transversal filter 27 of the embodiment. Sixteen delay circuits each having a delay time of 1T are serially connected, signals at input and output terminals of each delay circuit are weighted by amplifiers 16, and weighted signals are added together by an adder 17 to generate a PR equalization waveform. A gain of each amplifier 16 is called particularly a tap coefficient. In this embodiment, fifteen amplifiers are provided so that tap coefficients $C0, \ldots, C3, C5, \ldots, C11$, and $C13, \ldots, C16$ are made variable. The NRZI signal generated by the PRML reproduction circuit 26 is converted into a reproduced data signal by a decoder 30.

Figure 1:
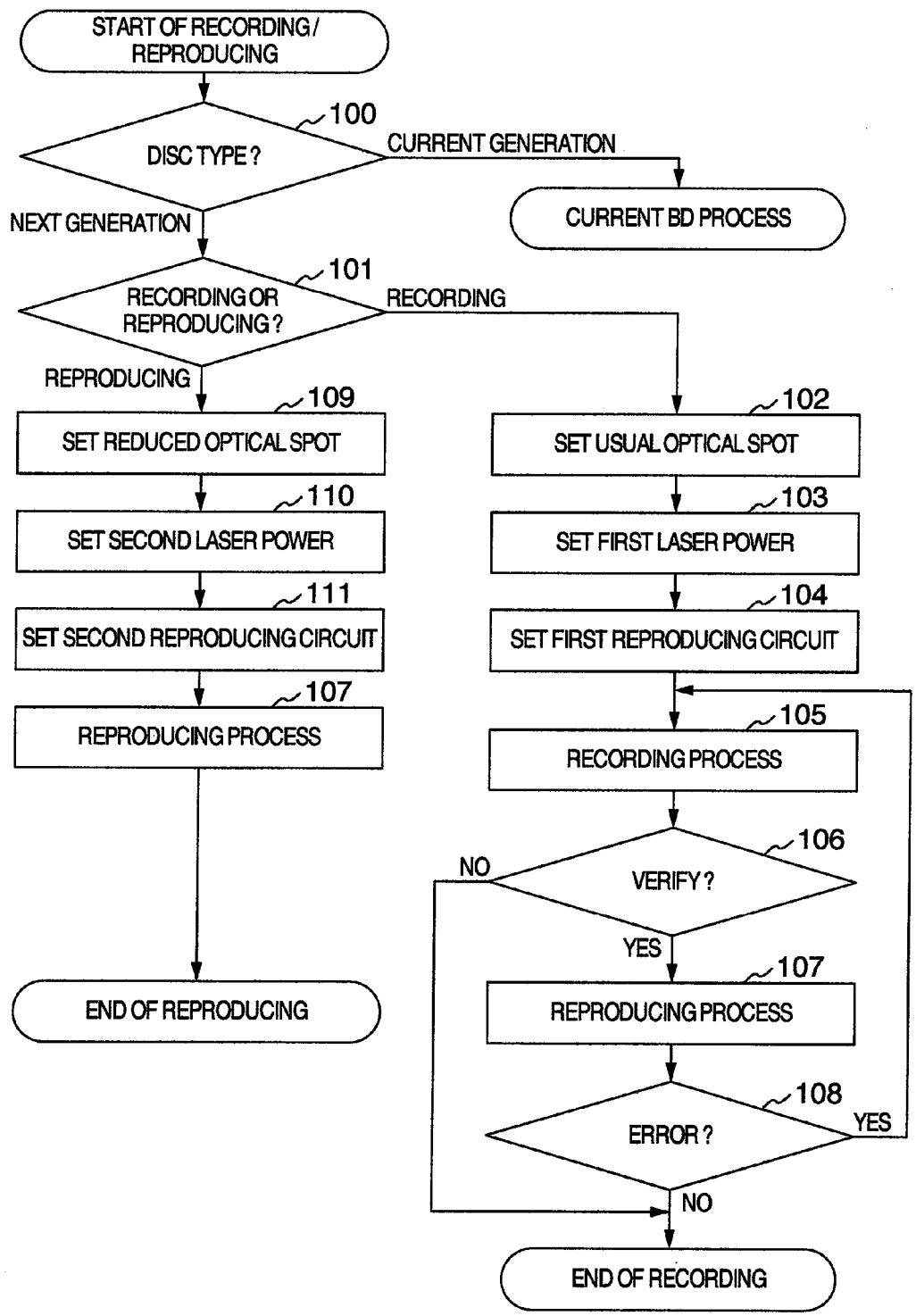
FIG. 1 is a flow chart illustrating a recording/reproducing operation of an optical disc apparatus according to a first embodiment of the present invention.

FIG. 1 is a flow chart illustrating a recording/reproducing operation of the embodiment. First at Step 100 it is judged whether a mounted disc is a current BD or a next generation BD. If the disc is a current BD, the flow branches to a current BD process which is in conformity with the recording/reproducing process to be executed by a recording/reproducing apparatus for current BD. If the disc is a next generation BD, it is judged at Step 101 whether the process contents are a recording operation or a reproducing operation. Namely, a process is branched depending upon whether an instruction from a host is a recording instruction or a reproducing instruction.

In the case of recording, at Step 102 the optical modulation unit 3 of the optical pickup 18 is set to the non-operation state to set a first optical spot.

A ratio (hereinafter called a light use efficiency) of an effective power of an optical spot converged by the objective lens 7 to an emission power of the laser light source 1 becomes different depending upon whether the optical modulation unit 3 is in the operation state or in the non-operation state. Even if the same drive current is supplied to the laser light source 1 to emit light, a power of a light spot output from the objective lens 7 and converged on the optical disc 14 becomes different. At Step 103, therefore, a first laser power is set corresponding to a first light use efficiency in the non-operation state of the optical modulation unit 3.

In this embodiment, the front monitor 11 is disposed between the optical modulation unit 3 and objective lens 7 so that the state of the optical modulation unit 3 does not adversely affect the relation between an output signal of the front monitor 11 and an optical spot effective power. A reproducing power can be set by setting the drive current so as to make the output signal of the front monitor 11 have a target level. A recording power can be set by referring to a first relational formula between the drive current of the laser light source 1 and an output signal of the front monitor 11, the coefficients of the first relational formula being stored in a memory in advance by considering an insufficient bandwidth and an output signal saturation of the front monitor 11. This relational formula is usually approximated by a linear expression in a range of laser emission.

In this embodiment, the optical system prevents a light flux reflected from the optical disc 14 from transmitting through the optical modulation unit 3. It is therefore possible to suppress a signal to noise ratio (SNR) of the detected signal from being lowered, and it is not necessary to switch an output gain of the photodetector 10 depending upon the state of the optical modulation unit 3.

A first reproducing circuit is set at Step 104. Namely, the above-described PRML reproduction series parameter setting circuit 29 sets tap coefficients of the transversal filter 27 and discrimination signal levels of the Viterbi decoder 28. In this embodiment, the PR class corresponding to next generation BD is PR (1, 2, 2, 2, 1). A side lobe of an optical spot has a peak at about 7T in correspondence with a scan time of a spot for next generation BD so that the corresponding tap coefficients C0, C1, C2 and C14, C15, C16 are set to "0" to thereby mask signal components detected with the side lobes.

At Step 105, a record sector is accessed and recording is performed by driving the laser light source 1 at a recording power. During recording, the optical modulation unit 3 is in the non-operation state so that it is possible to suppress a light use efficiency from being lowered and to reduce a load on the laser power source. A high emission power of driving the laser light source 1 at large current may result in an increase in a calorific value and shortening a life time.

At Step 106 it is judged whether verification is performed or not for flow branch. If verification is not to be performed, the process is terminated. If verification is to be performed, at Step 107 the sector recorded at Step 105 is accessed to reproduce data and evaluate a recording quality, without changing the settings of the first optical spot, first laser power and first reproducing circuit. The recording quality is judged at Step 108. If it is judged defective, the flow returns to Step 105 to execute a recording process. If it is judged good, the process is terminated.

If it is judged a reproducing process at Step 101, then a second optical spot is set at Step 109 by making the optical modulation unit 3 of the optical pickup 18 have the operation state.

At Step 110, a second laser power is set corresponding to a second light use efficiency in the operation state of the optical modulation unit 3.

In this embodiment, as described earlier, a reproducing power can be set by setting the drive current so as to make the output signal of the front monitor 11 have a target level. If necessary, a second relational formula between the drive current of the laser light source 1 and an output signal of the front monitor 11 may be referred to, the coefficients of the second relational formula being stored in a memory in advance by considering an insufficient bandwidth and an output signal saturation of the front monitor 11.

A second reproducing circuit is set at Step 111. Similar to Step 104, the PRML reproduction series parameter setting circuit 29 sets tap coefficients of the transversal filter 27 and discrimination signal levels of the Viterbi decoder 28. In this case, set values are different because the reproduction signal waveform changes with MTF. Also in the second optical spot, a side lobe of an optical spot has a peak at about 7T in correspondence with a scan time of a spot for next generation BD so that the corresponding tap coefficients C0, C1, C2 and C14, C15, C16 are set to "0" to thereby mask signal components detected with the side lobes.

A reproducing process is executed at Step 107 by accessing the sector to be reproduced. As described previously, as the optical modulation unit 3 enters the operation state, an optical spot reduces and the MTF characteristics change so that CNR of 3T is improved as illustrated in FIG. 7. It is therefore possible to suppress erroneous discrimination between the 2T and 3T signals in the PRML reproduction series and improve a bit error rate. Namely, a reproduction performance is improved. If Steps 102 to 104 and Steps 109 to 111 have already been set, these Steps may be skipped.

In the above-described verification, the reproducing process is executed using the first optical spot same as that for the recording process. Although the reproducing performance is inferior to that by the second optical spot, a recording quality can be evaluated under a severe condition so that stability of apparatus compatibility is improved when different apparatuses are used for recording/reproducing the optical disk 14.

Although it takes a predetermined time to switch between the operation state and non-operation state of the optical modulation unit 3, a recording time including the verification can be shortened effectively more than switching because settings of recording and verification are not changed.

In the above-described current BD processing flow, although the detailed description is omitted, the first optical spot is set by setting the non-operation state of the optical modulation unit 3 and the first laser power is set, irrespective of whether the operation is a recording operation, a reproducing operation or a verification reproducing operation. A third reproducing circuit is set whose PR class is PR(1, 2, 2, 1). A side lobe of an optical spot has a peak at about 5T in correspondence with a scan time of a spot for current generation BD so that the corresponding tap coefficients C1, C2, C3 and C13, C14, C15 are set to "0" to thereby mask signal components detected with the side lobes.

A recording/reproducing apparatus for current BD can be structured in a manner same as that for the conventional recording/reproducing apparatus for current BD so that design know-how such as recording strategy can be used. Stability of apparatus compatibility can be ensured easily when a conventional recording/reproducing apparatus reproduces the optical disc 14 recorded as in this embodiment or vice versa.

For reproducing for current BD, the PR class may be PR(1, 2, 2, 2, 1) same as that for next generation BD, and not only the PRML method is used but also the level slice method may be used.

Although the liquid crystal device of the optical modulation unit 3 of the embodiment can control optical rotation, the embodiment is not limited thereto, but the structure of polarization control by birefringence may be used. Although the optical modulation unit 3 of the embodiment modulates an amplitude, the embodiment is not limited thereto, but the structure of phase modulation allowing control of a refractive index or an optical path length may also be used.

2. Second Embodiment

Figure 10:
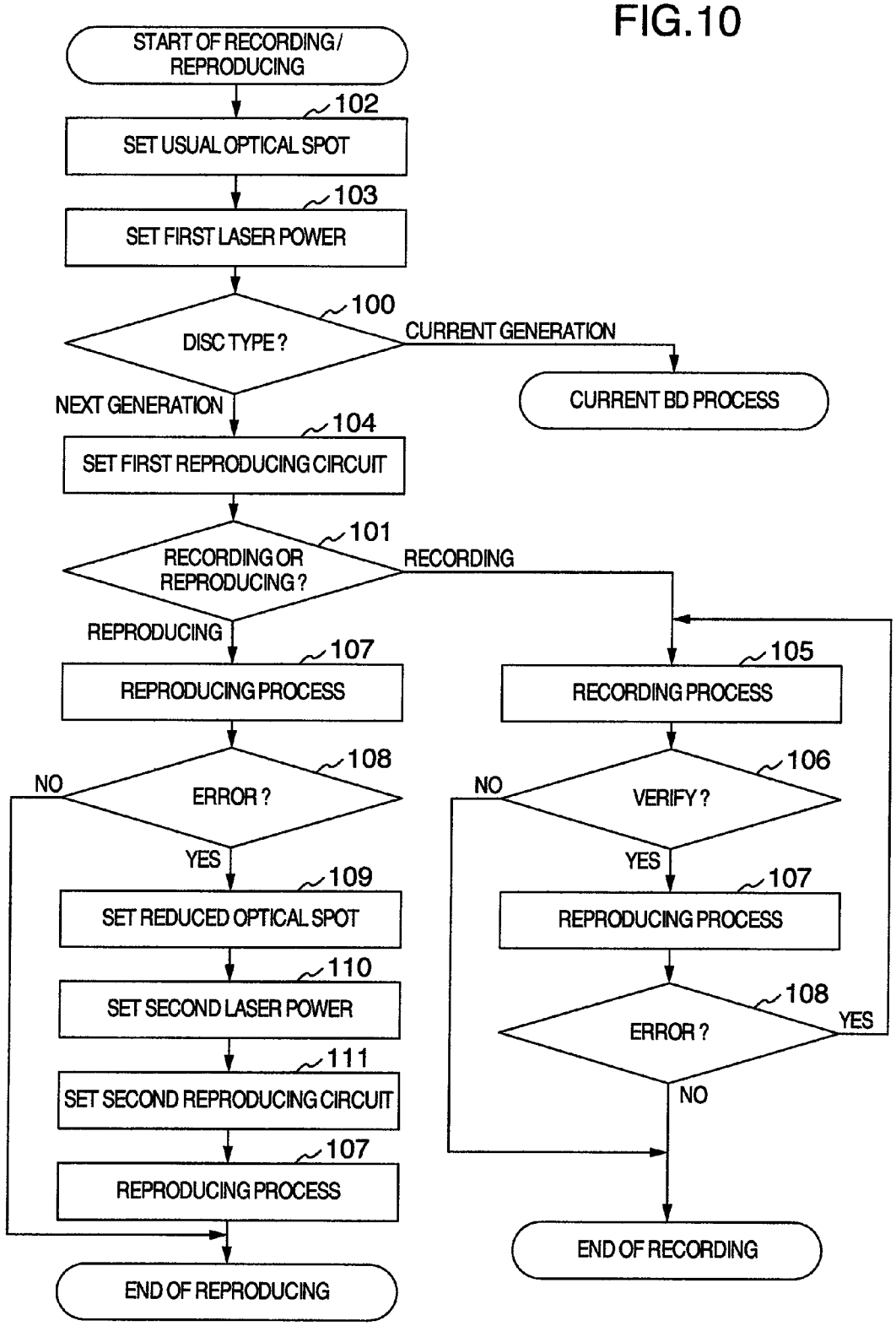
FIG. 10 is a flow chart illustrating a recording/reproducing operation according to a second embodiment.

FIG. 10 is a flow chart illustrating a recording/reproducing operation of the second embodiment. The structure of a recording/reproducing apparatus of the second embodiment is similar to that of the first embodiment, and its description is omitted.

Similar to the first embodiment, at Step 102 a first optical spot is formed by setting the optical modulation unit 3 to the non-operation state.

Similar to the first embodiment, at Step 103 a first laser power is set.

It is judged at Step 100 whether the disc is a current BD or next generation BD, for a branch process. It the disc is a current BD, the flow branches to a current BD process.

If the disc is a next generation BD, a first reproducing circuit is set at Step 104 similar to the first embodiment. It is judged at Step 101 whether the process contents are a recording operation or a reproducing operation. Namely, a process is branched depending upon whether an instruction from a host is a recording instruction or a reproducing instruction.

In the case of the recording instruction, similar to the first embodiment, at Step 105 a sector to be recorded is accessed, and the laser light source is driven at a recording power to emit light and record data. It is judged at Step 106 whether verification is to be performed. If verification is not to be performed, the process is terminated. If verification is to be performed, at Step 107 the recorded sector is accessed to reproduce the data and evaluate a recording quality. At Step 108 a recording quality is judged. If it is judged defective, the flow returns to Step 105 to execute a recording process. If it is judged good, the process is terminated.

In the case of the reproducing instruction, at Step 107 a sector to be reproduced is accessed to reproduce data. At Step 108 a reproduction result is evaluated and if there is no reproduction error, the process is terminated. If there is a reproduction error, at Step 109 a second optical spot is formed by setting the optical modulation unit 3 to the operation state similar to the first embodiment.

Similar to the first embodiment, at Step 110 a second laser power is set.

Similar to the first embodiment, at Step 111 a second reproducing circuit is set.

In this state, at Step 107 the sector to be reproduced is accessed to reproduce data and terminate the process.

Namely, if an error occurs at the first reproduction, retry reproduction is performed by operating the optical modulation unit 3 and changing each setting condition. As described earlier, since CNR of 3T is improved and a bit error rate is improved during this retry reproduction, a probability that the reproduction becomes possible is improved.

As described above, the operation of this embodiment is different from that of the first embodiment in that the optical modulation unit 3 is operated only during retry reproduction. A reproduction ability is the same as the first embodiment in the context of whether a disc can be reproduced. On the other hand, since it is expected that the occurrence frequency of switching the optical modulation unit 3 and each setting is reduced, it is effective in that an average time for a recording/reproducing time is shortened and a calorific value is suppressed because of a reduction in an average laser drive current.

In this embodiment, although retry reproduction only for next generation BD has been described, the embodiment is applicable to retry reproduction also for current BD. Namely, for retry reproduction for current BD, the second optical spot is formed by setting the optical modulation unit 3 to the operation state, and a second laser power is set. A fourth reproducing circuit suitable for these setting conditions is set. In this manner, a reproduction ability for current BD can be improved.

3. Third Embodiment

The third embodiment will now be described. In this embodiment, a recording/reproducing operation is performed relative to an optical disc 14 whose recording density is set 1.45 times of current BD, i.e., an optical disc having a high density of 36 GB per one layer on one side.

In the recording/reproducing apparatus of this embodiment, the central area of the liquid crystal display has the structure that transmission light is optically rotated in the operation state approximately by about 45 degrees, and a transmittance of the central area of the optical modulation unit 3 in the operation state is set approximately to 50%. A width of the central area is about one third of the incident light flux diameter similar to the first embodiment.

Figure 8:
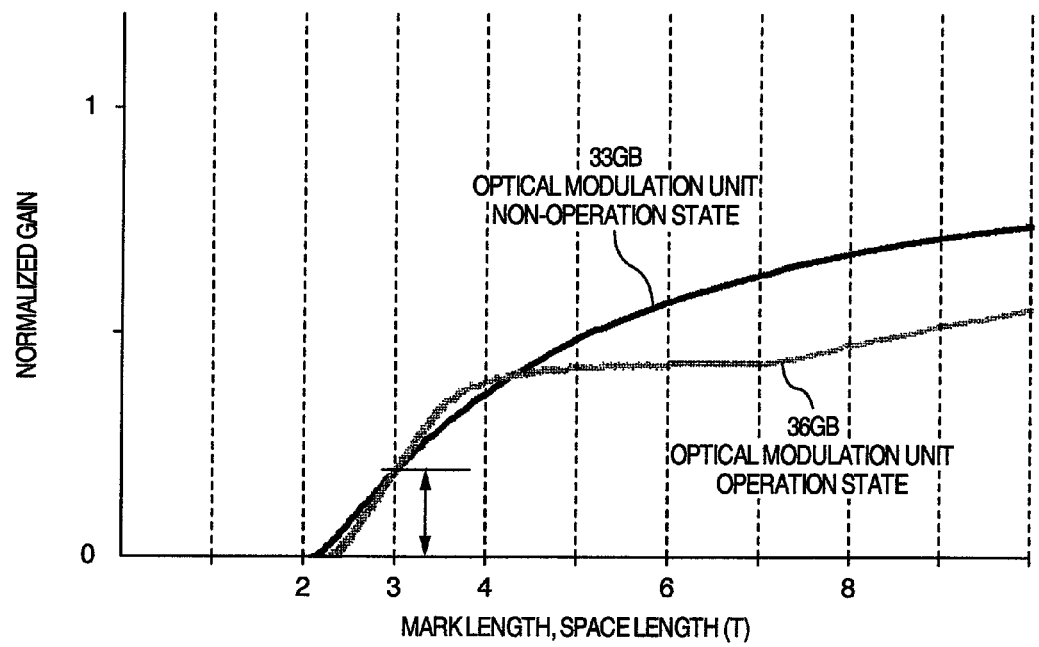
FIG. 8 is a graph illustrating an example of MTF calculation results of an optical system of a third embodiment, by plotting mark length and space length as the X axis.

FIG. 8 is a graph illustrating an example of MTF calculation results of this embodiment similar to FIG. 7, by plotting along the Y-axis the gain of MTF of a repetition pattern of mark length and space length used as the X-axis.

As the optical modulation unit 3 is set to the operation state, CNR of 3T is improved to the same degree of CNR when next generation BD of 33 GB is reproduced in the non-operation state of the optical modulation unit 3 (in other words, by the optical system corresponding to current BD).

A side lobe of an optical spot in the operation state of the optical modulation unit 3 has a peak at about 8T in correspondence with a scan time of a spot for an optical disk having a density of 36 GB of this embodiment so that the corresponding tap coefficients C0, C1 and C15, C16 are set to "0" to thereby mask signal components detected with the side lobes. Alternatively, the transversal filter 27 is constituted of eighteen serially connected delay circuits 15 each having 1T delay time, and seventeen amplifiers 16, tap coefficients C0, . . . , C4, C6, . . . , C12, C14, . . . , C18 are made variable, and the tap coefficients C0, C1, C2 and C16, C17, C18 are set to "0".

The structure and recording/reproducing operation of the apparatus are conformal to those of the first and second embodiments. Although the PR class is set to PR(1, 2, 2, 2, 1) conformal to the first embodiment, the embodiment is not limited thereto, but the constraint length may be elongated, for example, from "5" to "6" so that a reproduction ability may be expected to be improved.

According to the embodiment structure, similar to that an optical system for current BD of 33 GB can reproduce data from next generation BD by the PRML method, data can be reproduced from an optical disc having a high density of 36 GB by using an optical spot in the operation state of the optical modulation unit 3 and by setting a proper laser power and a proper reproducing circuit.

By increasing a gain of MTF on a high frequency side by lowering a transmittance of the central area or by another method and adding a correction circuit for correcting a waveform distortion caused by a lowered gain on a low frequency side, a high density becomes possible so long as a 3T spatial frequency is lower than a cutoff frequency.

In the embodiments, although BD is used, the embodiments are also applicable to an optical disc recording/reproducing apparatus for a first optical disc and a second optical disc using the format of the first optical disc and improving a recording density along a track direction.

The present invention is not limited to the above-described embodiments, but includes various modifications. For example, the above-described embodiments have been described in detail in order to make it easy to understand the present invention, and are not necessarily required to have all described constituent elements. A portion of the configuration of one embodiment may be added to the configuration of another embodiment. For a portion of the configuration of each embodiment, addition, deletion and replacement of the configuration of another embodiment may be made.

A portion or the whole of the above-described each configuration may be constituted of hardware, or may be realized by making a processor execute a program. Control lines and data lines necessary for description are provided, and all control lines and data lines necessary for products are not necessarily illustrated. It may be considered that almost all configurations are interconnected actually.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus comprising:
   an optical pickup comprising: a light source; an objective lens for converging a light flux emitted from said light source and forming an optical spot on an information recording plane of an optical disc; and an optical modulation unit divided into a plurality of areas for modulating an area containing a main beam of said light flux to change a shape of said optical spot;
   an optical modulation unit control circuit for controlling said optical modulation unit;

a transversal filter with variable tap coefficients;
a Viterbi decoder with variable discrimination signal levels; and
a parameter setting circuit for setting said tap coefficients and said discrimination signal levels,
wherein:
   a first optical spot is converged on a first optical disc by making said optical modulation unit be in an operation state, a first emission amount is set to said light source, first parameters are set to said transversal filter and said Viterbi decoder, and data is reproduced by converting a reproduction signal read from said first optical disc into an NRZI signal of a predetermined modulation rule by a PRML method;
   a second optical spot is converged by making said optical modulation unit be in a non-operation state, a second emission amount is set to said light source, and data is recorded on said first optical disc;
   a diameter of the second optical spot converged by making said optical modulation unit be in a non-operation state is larger than a diameter of the first optical spot converged by making said optical modulation unit be in an operation state; and
   after data is recorded on said first optical disc, the second optical spot is converged by making said optical modulation unit be in a non-operation state, second parameters are set to said transversal filter and said Viterbi decoder, and said recorded data is reproduced to evaluate a recording quality.

2. An optical disc recording/reproducing method for an optical disc apparatus,
   wherein the optical disc apparatus-comprises:
      an optical pickup comprising: a light source; an objective lens for converging a light flux emitted from said light source and forming an optical spot on an information recording plane of an optical disc; and an optical modulation unit divided into a plurality of areas for modulating an area containing a main beam of said light flux to change a shape of said optical spot;
      an optical modulation unit control circuit for controlling said optical modulation unit;
      a transversal filter with variable tap coefficients;
      a Viterbi decoder with variable discrimination signal levels; and
      a parameter setting circuit for setting said tap coefficients and said discrimination signal levels,
   the method comprising:
      converging a first optical spot on a first optical disc by making said optical modulation unit be in an operation state, setting a first emission amount to said light source, setting first parameters to said transversal filter and said Viterbi decoder, and reproducing data by converting a reproduction signal read from said first optical disc into an NRZI signal of a predetermined modulation rule by a PRML method; and
      converging a second optical spot by making said optical modulation unit be in a non-operation state, setting a second emission amount to said light source, and recording data on said first optical disc,
   wherein a diameter of the second optical spot converged by making said optical modulation unit be in a non-operation state is larger than a diameter of the first optical spot converged by making said optical modulation unit be in an operation state; and
   wherein after data is recorded on said first optical disc, the second optical spot is converged by making said optical modulation unit be in a non-operation state, second parameters are set to said transversal filter and said Viterbi decoder, and said recorded data is reproduced to evaluate a recording quality.

* * * * *